Feb. 14, 1967  D. R. BAILEY, JR  3,303,864
ALMOND CRACKER
Filed March 26, 1965  3 Sheets-Sheet 1
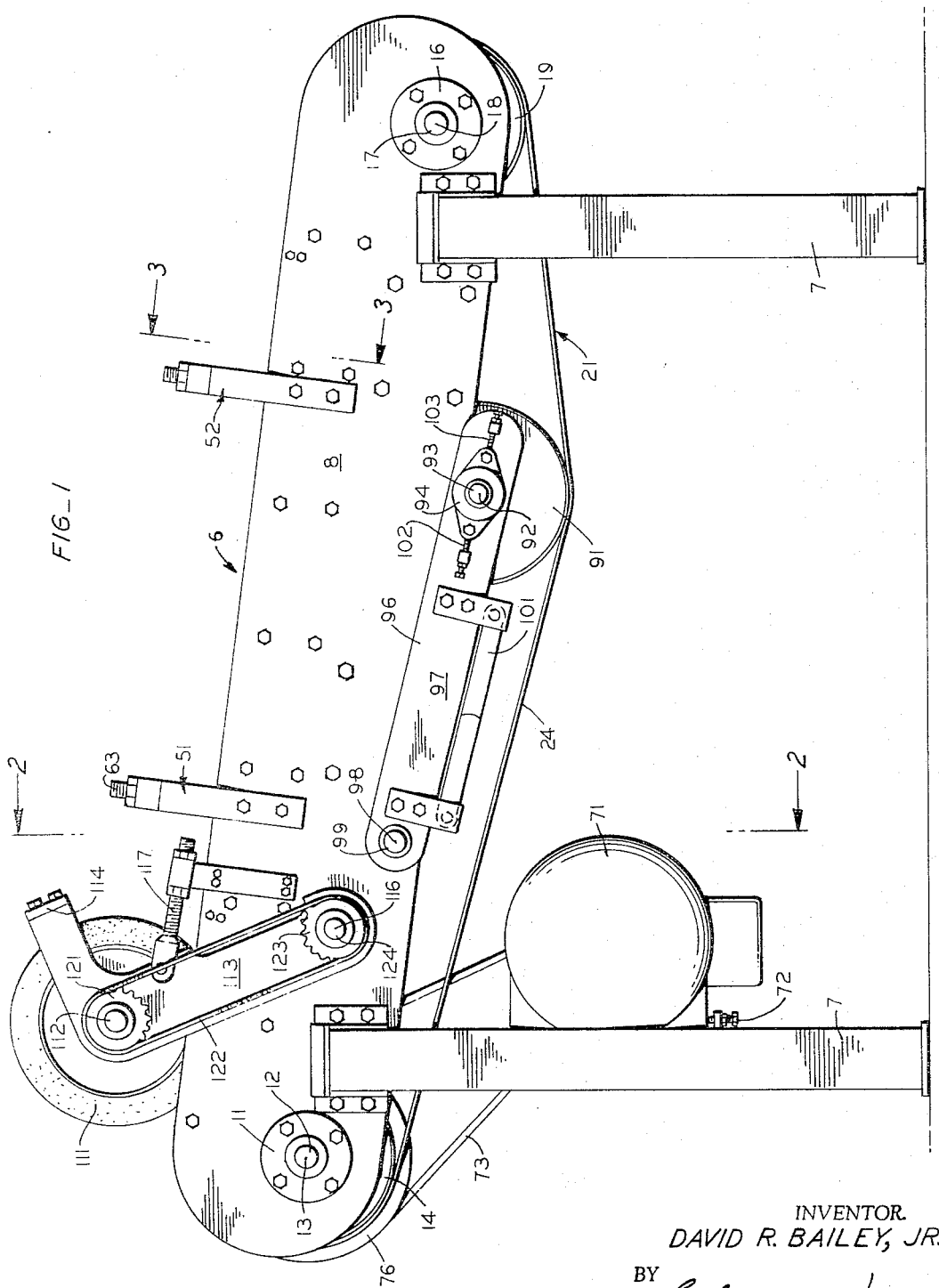
INVENTOR.
DAVID R. BAILEY, JR.
BY
Lothrop & West
ATTORNEYS

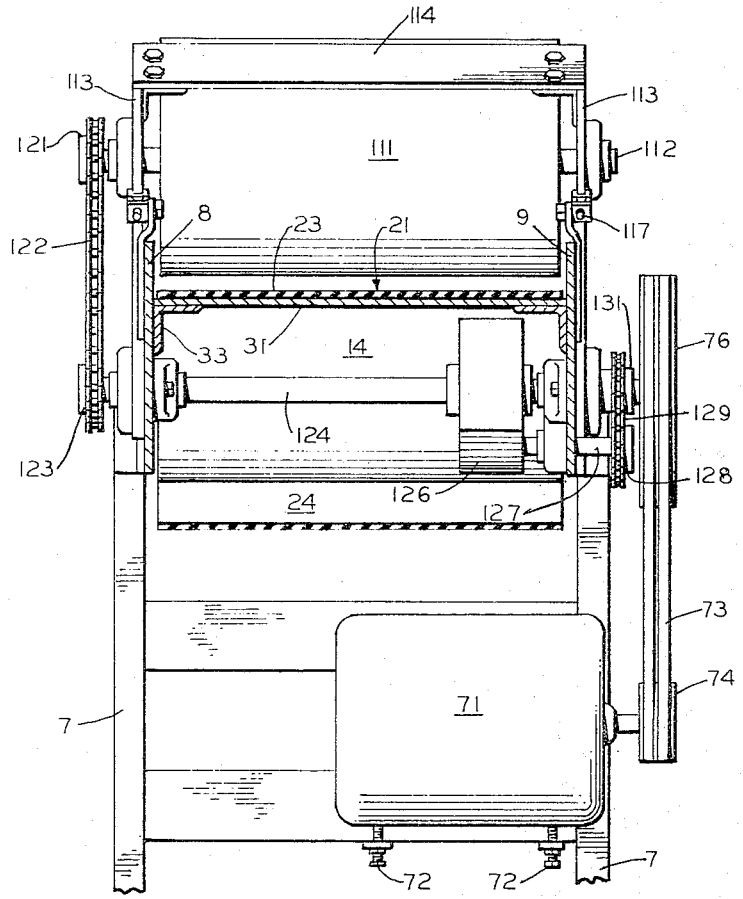
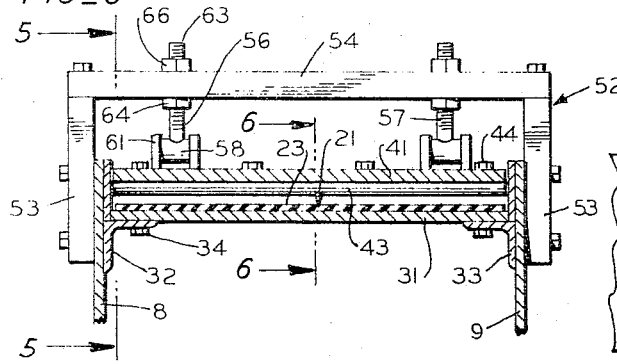
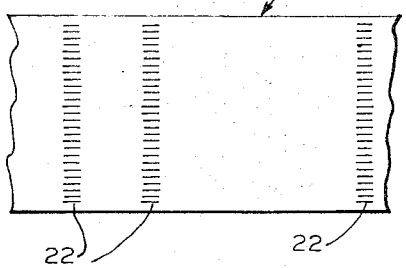

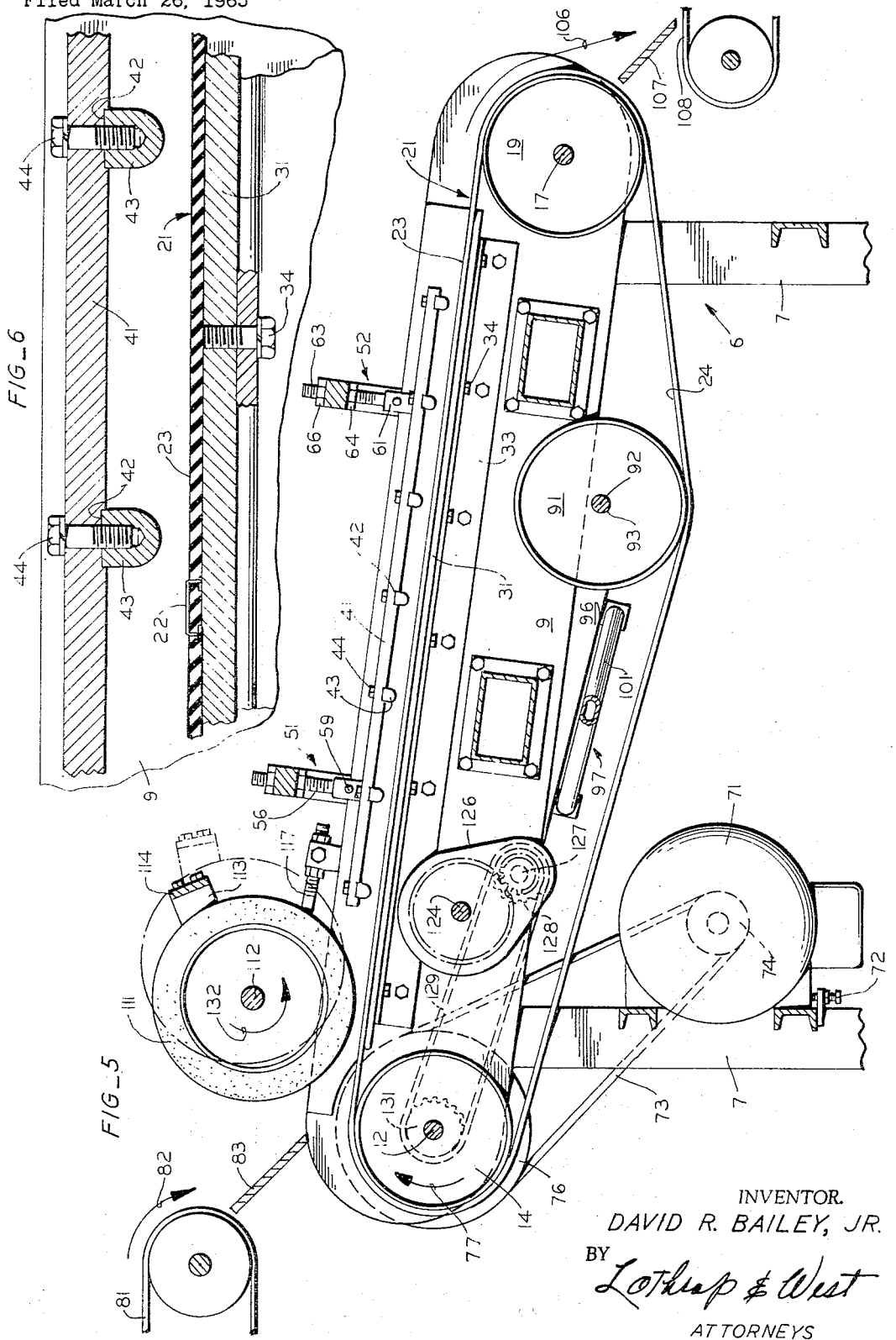

United States Patent Office 3,303,864
Patented Feb. 14, 1967

3,303,864
ALMOND CRACKER
David R. Bailey, Jr., Sacramento, Calif., assignor to California Almond Growers Exchange, a non-profit corporation of California
Filed Mar. 26, 1965, Ser. No. 443,002
8 Claims. (Cl. 146—11)

It is necessary in the processing of various nuts to remove the shell from the meat of the nut to afford a merchantable product. In order to do this, it is first necessary to crack the shell to start the separation process. My invention relates primarily to a machine for cracking almond shells. A related device is disclosed in Patent No. 1,678,098 issued to David R. Bailey on July 24, 1928.

It is an object of my invention in general to provide an almond cracker that is an improvement over the device disclosed in the mentioned patent.

Another object of the invention is to provide an almond cracker productive of a superior job of cracking the nut shells.

Another object of the invention is to provide an almond cracker in which the continuity of operation of the machine is enhanced despite substantial variations in the characteristics of the shells of the almonds being cracked.

Another object of the invention is to provide an almond cracker in which the service life of various of the parts, particularly of the cracking belt, is substantially improved.

Another object of the invention is to provide an almond cracker in which the general smoothness of operation of the mechanism is increased.

A still further object of the invention is to provide an improved almond cracker.

Other objects of the invention together with the foregoing are attained in the embodiment of the invention described in the accompanying description and illustrated in the accompanying drawings, in which:

FIGURE 1 is a side elevation of an almond cracker constructed pursuant to the invention;

FIGURE 2 is a cross section through the device of FIGURE 1, the plane of section being indicated by the line 2—2 of FIGURE 1;

FIGURE 3 is a cross section, the plane of which is indicated by the line 3—3 of FIGURE 1;

FIGURE 4 is a plan of a fragmentary portion of cracker belt as utilized in the machine;

FIGURE 5 is a longitudinal cross section through the entire machine, the plane of section being indicated by the line 5—5 of FIGURE 3; and FIGURE 6 is a detailed cross section, the plane of which is indicated by the line 6—6 of FIGURE 3, the figure being illustrated to an enlarged scale.

While the almond cracker pursuant to the invention can be utilized in many different environments and in connection with various varieties, kinds and forms of nuts, it has been particularly embodied and successfully operated primarily for use in connection with the cracking of very large quantities of almond.

In this description reference to almonds is intended to mean the nut after it has been removed from the tree and after any adhering external hull has been removed, so that there remains only the outer enclosing shell, which is to be cracked, and the enclosed meat. The device in many respects is similar to that shown in the patent mentioned above, but has a particular departure in certain arrangements for enhancing the smooth operation of the machine, for providing an improved cracking operation, and for increasing the life of various of the components.

In previous practice, the machines have been arranged so that the cracking belt is spring mounted to maintain predetermined tensions in all portions of the belt at all times. It has been found to be a superior arrangement to depart from that teaching. In order to do so, I provide in my almond cracker a frame 6 comprised of the customary structural members and including a number of uprights 7 to support a pair of side plates 8 and 9. At one end, the feeding end, the frame carries journals 11 for supporting a driving shaft 12 designed to rotate about a transverse horizontal axis 13 and also designed to carry a driving drum 14. In a somewhat familiar fashion, at its other end the frame carries journals 16 mounting a driven shaft 17 for rotation about a horizontal transverse axis 18 parallel to the axis 13. A driven drum 19 is mounted on the shaft 17.

Trained around the drums 14 and 19 is a cracker belt 21. This belt is of the customary rubberized fabric flexible construction and in the customary fashion at intervals along its length is provided with cracker teeth 22 formed by slightly protruding metallic inserts. The belt 21 is arranged around the drums 14 and 19 to afford an upper run 23 that is relatively short, being disposed substantially at a common tangent to the two drums 14 and 19. The belt 21 also provides a lower run 24 that is relatively long with respect to the upper run and, while tangent to both drums, is not at a common tangent to both of the drums 14 and 19.

Located immediately below and in substantial contact with the lower surface of the upper run 23 is a lower cracker plate 31. This is preferably a smooth, planar metallic member detachably supported on angles 32 and 33 mounted on the side plates 8 and 9. Appropriate fastenings 34 secure the parts in position. The lower cracker plate serves as a support and guide for the upper run 23 and is thus itself substantially at a common tangent to both of the drums 14 and 19, extending for almost the entire distance therebetween.

Located between the side members 8 and 9 and situated above the upper surface of the upper run is an upper cracker plate 41. This also is a metallic plate, but is somewhat shorter than the lower cracker plate. A plurality of transverse grooves 42 are formed in the plate 41 in which cracking cleats 43 are fastened by securing devices 44. It is desired that the upper cracker plate be situated at any predetermined or selected distance above the upper run of the belt.

The upper cracker plate is made adjustable so as to occupy a position parallel to the upper run of the belt or at an inclination thereto. For that reason, particularly as shown in FIGURES 1 and 3, the frame 6 is at appropriate points provided with a pair of bridges 51 and 52, each of which includes uprights 53 and cross members 54 spanning the distance across the frame. From each of the bridges a pair of supporting devices 56 and 57 depend. The four supporting devices so provided are substantially identical. Each of them includes a lower boss 58 carrying a through pin 59 mounted in ears 61 on the upper cracker plate to form a pivot connection. Each boss 58 is secured to a threaded stem 63 passing through the cross member 54 and secured in position with respect thereto by a pair of jam nuts 64 and 66.

Since the supporting devices 56 and 57 are spaced apart transversely of the upper cracker plate as well as longitudinally of the upper cracker plate, that plate is firmly held in any adjusted position and at any longitudinal slope despite vibration and shocks attendant upon the operation of the machine. A fine degree of adjustment can be provided and locked by manipulating the jam nuts 64 and 66. Despite the precision of this adjustment, no binding takes place at any time because of the provision of the two parallel pairs of transversely aligned pivot bosses 58.

Means are provided for driving the cracker belt. Situated on the frame 6 is an electric motor 71 having an appropriate mounting adjustment 72 and driving belts 73 trained between a pulley 74 on the motor shaft and a pulley 76 on the driving shaft 12. The direction of drive is as indicated by the arrow 77 in FIGURE 5, so that the upper run of the belt is fed from the driving drum 14 over the lower cracker plate 31 to the driven drum 19.

As the belt so advances, generally in a downhill direction if the machine is slightly inclined, as it usually is and as it is illustrated herein, almonds from a suitable source are brought in on an appropriate conveyor 81 and are discharged in the direction of the arrow 82 onto a deflector plate 83. Almonds are thus lodged on the upper run of the cracker belt between the driving roller 14 and the beginning of the lower cracker plate 31 and the beginning of the upper cracker plate 41.

As the almonds are advanced toward the right in FIGURE 5, they are brought beneath and in contact with the cleats 43 on the stationary upper cracker plate 41 and are also from time to time engaged by the cracking cleats 22 on the belt 21. The resulting action cracks the shells and fragments them so that they can separate from the internal meats. From time to time, some of the almonds tend to get jammed between the cleats 43 and the cleats 22. This tends to put an abrupt drag on the lower portion of the belt upper run. This action, unless relieved, produces high stresses and vibration in operation, the destruction of some of the almond meats and particularly accelerates wear on some of the parts.

To obviate these difficulties, I have in the present instance provided a particular mechanism arranged so that temporary overloads of the indicated sort are not excessive nor deleterious, but may even be beneficial in assisting in cracking the nut shells. For that reason, the relatively long lower run 24 on the belt is trained beneath an idler roll 91 substantially of the same diameter as the drums 14 and 19. The roll 91 is designed to rest upon the upper surface of the lower run 24 with its entire weight being borne by the lower run. As the belt advances, the roll is revolved by the passing lower run about a movable, horizontal cross axis 92 parallel to the fixed axes 13 and 18.

In order that the roll can be confined in a fore and aft direction with respect to the machine frame, although remaining free in a generally vertical direction, and in order that the roll axis despite rising and falling can be maintained substantially parallel to the axes 13 and 18, the roll is disposed on a cross shaft 93 mounted in journals 94 carried by the side arms 96 of an idler roll frame 97. This is mounted to swing about a stationary cross axis 98 parallel to the axes 13, 92 and 18. The frame 97 is journalled on a cross shaft 99 concentric with the axis 92 and is braced to operate as a unit by an X bracing 101 joining the side arms 96. To establish and maintain an appropriate alignment, at least one of the journals 94 is designed to slide longitudinally in its mounting arm and is provided with positioning screw adjustments 102 and 103.

This arrangement is such that not only is the entire weight of the idler roll 91 borne by the lower run 24 of the belt, but also a large part of the weight of the frame 97 is likewise transmitted to the lower run of the belt. This means that the constant force of gravity is effective to maintain the contour of and the tension in the belt. This tension is not uniform throughout the entire belt. Since the driving roller 14 pulls the lower run of the belt from the driven drum 19 beneath the idler roll 91 and then onto the driving roll 14, and since the upper run of the belt is discharged from the driving drum toward the driven drum, there is a tendency for any slack that develops to arise in the upper run near the feed area.

When an almond lodges between one of the cross cleats 43 and one of the cleats 22 of the belt, thus increasing the drag on the downstream portion of the belt, this extra drag is transferred around the driven drum and is imparted to the lower run of the belt. The tendency is then for the lower belt run to shorten and lift the idler roll 91 against the force of gravity and in effect allows temporary slack. Since the idler roll 91 has substantial mass, it tends to act like a flywheel. This immediately limits the load between the lodged almond and the engaging cleats to the extent permitted by the momentum and lifting of the idler roll. This also allows the driving drum to operate substantially uniformly. The momentary change in conditions is usually effective to crack the almond and to advance it toward the driven drum. Following this temporary change in the forces upon some portions of the belt, the roll 91 descends by gravity and the operating conditions are as before.

During the continuous operation of the machine, the idler roll 91 can be observed to bob up and down intermittently and in varying amounts, and the driving mechanism operates quite smoothly. The life of the belt and associated parts in practice has been substantially lengthened. More important, the nut cracking operation of the machine is enhanced so that a larger percentage of properly cracked nuts is discharged from the belt over the driven roller 19 in the direction of the arrow 106 onto a deflector 107 and onto a discharge conveyor 108.

The operation as just described is particularly effective with almonds having a relatively hard shell. In instances wherein relatively soft shelled almonds are to be cracked, the upper cracker plate 41 is lifted by adjustment of the mechanisms 56 and 57 far enough above the upper run of the belt so as to be entirely out of the way. There is then lowered into position a cracking drum 111 previously held out of active position. The cracking drum is provided with a yielding, elastomeric surface and is designed to rotate as impelled by a shaft 112 mounted in swinging side arms 113. These are joined as a pair by a cross strut 114 and are held in position about a pivotal axis 116 by threaded positioning devices 117 secured to the frame side. By appropriate setting of the devices 117, the surface of the cracker roller 111 is suitably disposed just above the upper run of the cracker belt and above the leading edge of the lower cracker plate.

The cracking drum 111 is driven. For that reason, the shaft 112 at one end carries a sprocket 121 connected by a chain 122 to a sprocket 123 carried by a cross shaft 124 coaxial with the journals carrying the arms 113 and extending through the driven side of a gear reducer 126. The driving side of the gear reducer has a shaft 127 on which a sprocket 128 is fastened. A driving chain 129 not only engages the sprocket 128, but is trained around a sprocket 131 fast on the shaft 12. Since this shaft is driven by the motor 71, the cracking drum roll 111 is driven by the motor 71 in the direction of the arrow 132 (FIGURE 5). With this arrangement, the almonds passing between the cracking drum 111 and the upper run are effectively cracked as before, and while the frequency of the jamming tendency is not as great with the softer shell nuts, it nevertheless does occur. In this event, the idler roll 91 yields vertically to reduce peak stresses in the belt and associated parts, to reduce uneven driving loads on the motor, and to ensure that an appropriate cracking force is imposed upon the almonds so that improved results are attained.

What is claimed is:

1. An almond cracker comprising a frame, a driving drum, a driven drum, means for journalling said drums on said frame for rotation about parallel horizontal axes a fixed distance apart, a belt trained around said drums to provide an upper run and a lower run, an idler roll, means for mounting said idler roll on said frame to bear by gravity upon said lower run and for rotation by said lower run, a lower cracker plate fixed on said frame and disposed beneath and in substantial contact with said upper run, an upper cracker plate mounted on said frame for movable positioning spaced above said upper run, and means on said frame for rotating said driving drum to pull said lower run from said driven drum past said idler roll to said driving drum.

2. An almond cracker as in claim 1 and including means for depositing almonds to be cracked on said upper run between said driving drum and said upper cracking plate.

3. An almond cracker comprising a frame, a driving drum, a driven drum, means for journalling said drums on said frame for rotation about parallel horizontal axes a fixed distance apart, a belt training around said drums to provide an upper run and a lower run, an idler roll, means for positioning said idler roll to bear by gravity upon said lower run, a lower cracker plate fixed on said frame and disposed beneath and in substantial contact with said upper run, a pair of arches on said frame spanning said upper run, a pair of adjusting screws engaging each of said arches, an upper cracker plate mounted on said adjusting screws and disposed just above said upper run, and means on said frame for rotating said driving drum to pull said lower run from said driven drum past said idler roll to said driving drum.

4. An almond cracker as in claim 3 in which said arches of said pair are spaced apart along the length of said upper run and said adjusting screws of said pair are spaced apart across the width of said upper run.

5. An almond cracker comprising a frame, a driving drum, a driven drum, means for journalling said drums on said frame for rotation about parallel horizontal axes a fixed distance apart, a belt training around said drums to provide an upper run and a lower run, a pair of support arms, means for journalling said support arms on said frame for swinging movement about a third axis parallel to said horizontal axes, an idler roll, means for journalling said idler roll to rotate on said support arms about a fourth axis parallel to said horizontal axes and to bear by gravity upon said lower run, a lower cracker plate on said frame and disposed beneath and in substantial contact with said upper run, an upper cracker plate, means on said frame for disposing said upper cracker plate at a predetermined distance above said upper run, and means on said frame for rotating said driving drum to pull said lower run from said driven drum past said idler roll to said driving drum.

6. An almond cracker comprising a frame, a driving drum, a driven drum, means for journalling said drums on said frame for rotation about parallel horizontal axes a fixed distance apart, a belt trained around said drums to provide a relatively short upper run and a relatively long lower run, a lower cracker plate fixed on said frame and disposed beneath and in substantial contact with said upper run, an upper cracker plate, means on said frame for disposing said upper cracker plate at a selected distance above said upper run, means on said frame for rotating said driving drum to pull said relatively long lower run from said driven drum to said driving drum, and an idler roll having its entire weight resting upon the upper surface of said lower run and rotating in contact with said lower run about an axis parallel to said horizontal axes.

7. An almond cracker as in claim 6 in which means are provided on said frame augmenting the weight of said idler roll resting upon said lower run and for positioning said idler roller relative to said frame.

8. An almond cracker comprising a frame, a driving drum, a driven drum, means for journalling said drums on said frame for rotation about parallel horizontal axes a fixed distance apart, a belt trained around said drums to provide a relatively short upper run and a relatively long lower run, a lower cracker plate fixed on said frame and disposed beneath and in substantial contact with said upper run, means on said frame for engaging the upper portion of almonds on said upper run above said lower cracker plate, means on said frame for rotating said driving drum to pull said relatively long lower run from said driven drum to said driving drum, and an idler roll having its entire weight resting upon the upper surface of said lower run and rotating in contact with said lower run about an axis parallel to said horizontal axes.

References Cited by the Examiner

UNITED STATES PATENTS

| 1,364,083 | 1/1921 | Demerath | 146—32 |
| 1,678,098 | 7/1928 | Bailey | 146—11 |
| 1,791,362 | 2/1931 | LaForge | 146—8 |
| 1,867,986 | 7/1932 | Rankine | 146—291 |

WILLIAM W. DYER, Jr., *Primary Examiner.*

W. GRAYDON ABERCROMBIE, *Examiner.*